R. HUFF.
GASOLENE TANK FOR MOTOR VEHICLES.
APPLICATION FILED AUG. 26, 1907.
942,907.
Patented Dec. 14, 1909.
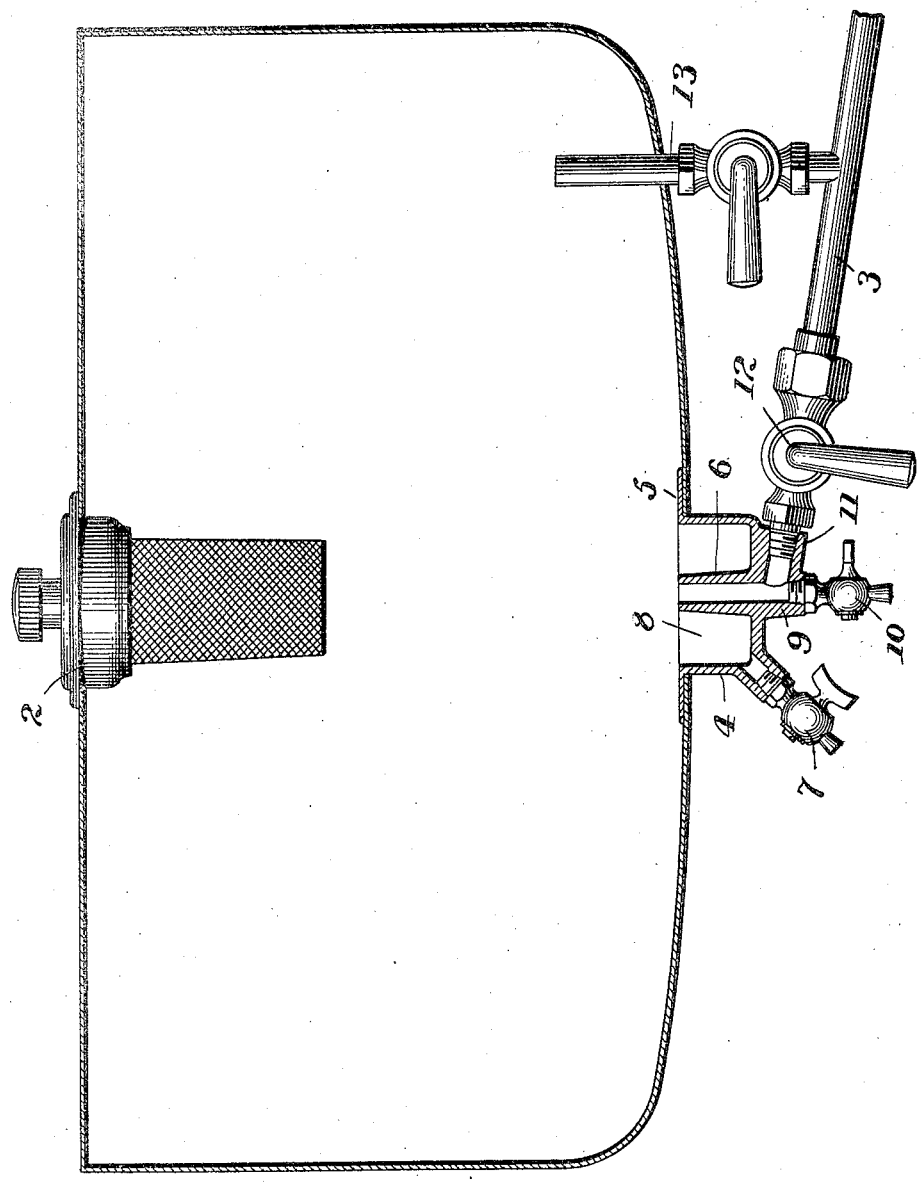

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

GASOLENE-TANK FOR MOTOR-VEHICLES.

942,907.     Specification of Letters Patent.     Patented Dec. 14, 1909.

Application filed August 26, 1907. Serial No. 390,224.

*To all whom it may concern:*

Be it known that I, RUSSELL HUFF, a citizen of the United States, and residing at Detroit, Wayne county, Michigan, have invented certain new and useful Improvements in Gasolene-Tanks for Motor-Vehicles, of which the following is a specification.

My invention relates to supply tanks in which means is provided for separating the liquid contained therein from heavy sediment and foreign matter, which may be mixed therewith, and in thus preventing the sediment and foreign matter from passing through the outlet to the place of use. It is particularly applicable to gasolene tanks for use on motor vehicles.

It consists in a cup-shaped sediment collector placed in the bottom part of the tank and having an outlet tube extending up through this sediment collector, but not above the bottom of the tank.

It also consists in the details of construction whereby the sediment collector is made of a convenient and efficient form and is attachable to any oil tank.

The single view in the drawing shows the tank and sediment collector in cross section.

As shown in the drawing, the ordinary gasolene tank 1 of a motor vehicle is provided with a filling cap 2 and an outlet pipe 3 leading to a carbureter, not shown. At the lowest point in the bottom of the tank is shown a cup-shaped collector 4 which, in this instance, is provided with the flange 5 at the top, which may be connected to the tank 1 in any suitable manner. Extending up through the center of the bottom of this cup-shaped collector is the outlet tube, the upper and lower parts of which are marked, respectively, 6 and 9. In the preferred form shown, these parts are made integral with the cup-shaped collector 4 and the upper end of the part 6 is on the same plane as the top of the side walls of the collector, and is thus flush with the bottom of the tank. I have shown the lower part 9 as provided with the screw-threaded sockets to receive the drain cock 10, and the screw-threaded end 11 of the outlet pipe 3. The casting forming the cup-shaped collector is furthermore provided at its bottom with a screw-threaded projection which receives the drain cock 7. It will be noted that the cup-shaped casting and the central tube 6 together form an annular depression 8, which is below the lowest point of the bottom of the tank, and it is obvious that any foreign matter heavier than the liquid in the tank will sink to the bottom, thus entering this annular depression without reaching and passing through the outlet tube 6. The outlet tube 3 is provided with the controlling valve 12, and I have shown connected with this outlet tube beyond the valve 12 an outlet pipe 13 which passes up through the bottom of the supply tank 1, and terminates a short distance above the bottom. This outlet 13 terminating above the bottom is one which is sometimes used on the gasolene tanks of motor vehicles for the purpose of having in the tank a reserve supply of oil. This reserved supply may ordinarily be drawn off by a pipe entering the lowest part of the tank, and the purpose of having the main outlet 13 terminate above the bottom is to give notice to the operator that his supply is nearly exhausted.

My improved sediment collector may be used in connection with an outlet pipe like 13, terminating above the bottom, or that pipe may be omitted and my improvement used alone.

As shown in the drawing I prefer to make the sediment collecting cup-shaped attachment as a single casting including the cup-shaped part, top flanges, central tube and bushings, but this is of course not essential. Being a separate article, my sediment collector may be conveniently attached or applied to any ordinary supply tank, and it will, however applied, collect the sediment and prevent the passage of heavy foreign matter through the outlet.

What I claim is:

1. A sediment collector comprising a cup-shaped attachment having means at its top for securing it to a vessel, a central tube therein, the upper open end of which is above the bottom and does not extend above the top walls, means for connecting an outlet pipe with the lower end of the central tube, a drain cock in the bottom of the cup-shaped attachment, and a drain cock in the bottom of said tube.

2. A sediment collector comprising a cup-shaped attachment in one piece having a flange at its top, a central tubular portion projecting upwardly from the bottom and not extending above the top, the said tubular portion being open at its lower end, a lateral opening near the bottom of said tubular portion adapted to be connected with an outlet pipe, and a screw-threaded drain opening in the bottom of said cup-shaped attachment.

3. A sediment collector comprising a cup-shaped attachment having a flange around its top, a central tube therein, the upper open end of which is on the same plane as the top walls of the attachment, means for connecting an outlet pipe with the lower end of the central tube, and a drain cock in the bottom of the cup-shaped attachment.

4. A sediment collector comprising a cup-shaped attachment having a flange around its top, a central tube therein the upper open end of which is on the same plane as the top walls of the attachment, means for connecting an outlet pipe with the lower end of the central tube, a drain cock in the bottom of the cup-shaped attachment, and a drain cock in the bottom of said tube.

5. A sediment collector comprising a cup-shaped attachment having a flange around its top, a central tube therein, the upper open end of which is in substantially the same plane as the top of the attachment, means for connecting an outlet pipe with the lower end of the central tube, and a drain cock in the bottom of the cup-shaped attachment.

In testimony whereof I affix my signature in presence of two witnesses.

RUSSELL HUFF.

Witnesses:
MILTON TIBBETTS,
CLARA I. DALE.